United States Patent [19]

Baumann et al.

[11] Patent Number: 5,753,116
[45] Date of Patent: May 19, 1998

[54] COOLANT FILTER

[75] Inventors: Dieter Baumann, Greven-Gimbte; Bernhard Batram, Greven; Jörg Homberger, Ostfildern, all of Germany

[73] Assignees: Ing. Walter Hengst GmbH & Co., Munster; KG & Mercedes-Benz AG, Stuttgart, both of Germany

[21] Appl. No.: 736,139

[22] Filed: Oct. 28, 1996

[30] Foreign Application Priority Data

Oct. 28, 1995 [DE] Germany ............ 195 40 251.0

[51] Int. Cl.$^6$ .................................. B01D 27/08
[52] U.S. Cl. ............ 210/206; 210/209; 210/233; 123/1 A; 123/196 A; 222/81
[58] Field of Search ............ 210/232, 233, 210/238, 205, 206, 209; 222/80, 81, 91; 123/1 A, 196 A

[56] References Cited

U.S. PATENT DOCUMENTS

| | | | |
|---|---|---|---|
| 3,710,930 | 1/1973 | Owdom | 210/233 |
| 3,749,247 | 7/1973 | Rohde | 210/205 |
| 3,912,633 | 10/1975 | Delaney | 210/233 |
| 4,151,823 | 5/1979 | Grosse et al. | 210/168 |
| 4,265,748 | 5/1981 | Villani et al. | 210/206 |
| 5,030,345 | 7/1991 | Thomas | 210/248 |
| 5,050,549 | 9/1991 | Sturmon | 210/209 |
| 5,435,462 | 7/1995 | Fujii | 222/91 |
| 5,552,040 | 9/1996 | Baehler et al. | 210/209 |
| 5,591,330 | 1/1997 | Lefebvre | 210/209 |

FOREIGN PATENT DOCUMENTS 590618  7/1947  United Kingdom ............ 210/233

*Primary Examiner*—W. L. Walker
*Attorney, Agent, or Firm*—Hill, Steadman & Simpson

[57] ABSTRACT

A coolant filter assembly for attachment to a coolant circulation system of a motor or to a motor housing is provided. The filter assembly includes a housing that accommodates a cylindrical filter cartridge. The housing is sealably connected to the coolant circulation system. The filter cartridge accommodates a sealed chamber between the two opposing ends of the filter cartridge and the inner surface of the filter cartridge. The sealed chamber may be comprised of a continuous sealing layer. As the housing is attached to the coolant circulation system, the sealing layer is punctured or otherwise broken to release liquid coolant additive to the coolant circulation system.

20 Claims, 4 Drawing Sheets

COOLANT FILTER

BACKGROUND OF THE INVENTION

The present invention relates to cooling medium filters. Cooling medium filters or coolant filters are known. They are used for filtering the cooling medium of an internal combustion engine and can be used for the replenishment or addition of the cooling medium additive. Coolant filters may be designed with a supporting base and an upstanding housing with downwardly extending hanging housings.

A new filter insert is inserted into the housing during a routine service operation. Therefore, because it is practical to manufacture the filter insert from paper so that it can be incinerated, it is necessary to provide an inner dome for structural support which is also fabricated from material that can be incinerated.

Further, a cooling medium additive in solid form may be supplied into the interior of a filter insert in a known cooling medium filter with the solid being dissolved when it comes in contact with the circulating coolant. The required mixing ratio of the additive in the cooling circuit is attained after a non-defined period.

One disadvantage of the known cooling medium filters is that they receive cooling medium additives only in solid form. The addition of liquid coolant additives simultaneously with or independent from a change of filter is attained by adding the additive directly to the coolant circulation system. The exact dosage is accomplished by the operator.

Several cooling medium additives are available only in liquid form and have to be transferred into a solid form in a separate procedure in order to be provided with a filter insert. Many modern organic cooling mediums are only to be processed into a solid form under laboratory conditions which makes their conversion into a solid form cost prohibitive.

Accordingly, there is a need for an improved method of delivering liquid coolant additive to a coolant circulation system. There is also a need for an improved coolant filter insert which makes it easier to add liquid coolant additives with the change of the filter insert.

SUMMARY OF THE INVENTION

It is the object of the present invention to further develop a known cooling medium filter such that the cooling medium additive may be brought into the cooling medium filter comfortably in a liquid form in an exact metered amount.

The above object is attained with a generic cooling medium filter which comprises a housing that accommodates a cylindrical filter cartridge. The housing includes a means for sealably connecting the housing to the coolant circulation system. The housing also accommodates a filter cartridge which is generally cylindrical in shape. The filter cartridge, in turn, accommodates a supply of coolant additive that is contained within a chamber defined by the two opposing ends of the filter cartridge and the inner surface of the filter cartridge. A continuous sealing layer contains the coolant additive until the sealing layer is punctured upon connection of the housing to the coolant circulation system. The housing further comprises a means for puncturing the sealing layer upon connection of the housing to the coolant circulation system.

In an embodiment, the means for puncturing the sealing layer includes a protruding member that is attached to the housing adjacent to one end of the filter cartridge. As the housing is connected to the coolant circulation system, the protruding member engages the sealing layer and punctures it thereby permitting release of the coolant additive.

In an embodiment, the means for puncturing the sealing layer includes a protruding member attached to the sealing layer at one end of the filter cartridge. As the housing is attached to the coolant circulation system, the protruding member engages an end of the housing thereby applying stress to the sealing layer and breaking the sealing layer as the housing is connected to the coolant circulation system.

In an embodiment, a protruding member is attached to the coolant circulation system which engages the sealing layer as the filter assembly is attached to the coolant circulation system thereby breaking the sealing layer and releasing the coolant additive.

In an embodiment, the sealing layer is punctured at both the first end of the filter cartridge and at the second end of the filter cartridge thereby enabling axial flow through the inside of the filter cartridge.

In an embodiment, a score line is provided at the sealing layer where the sealing layer is to be punctured to facilitate the breakage of the sealing layer.

In an embodiment, the coolant additive is provided in the form of a packet disposed inside the filter cartridge between the first and second opposing ends of the filter cartridge. The packet is punctured at at least one end of the filter cartridge as the filter assembly is attached to the coolant circulation system. Preferably, the sealed packet is punctured at both the first end of the filter cartridge as well as the second end of the filter cartridge to permit axial flow through the filter cartridge.

In an embodiment, the sealing layer further includes a plurality of supporting connections which either engage or are attached to the inner surface of the filter cartridge to provide structural support for the filter cartridge.

In an embodiment, in addition to a protruding member which engages the housing and results in breakage of the sealing layer, the sealing layer further comprises at least one spacing member which has a height less than the height of the protruding member so that the sealing layer remains spaced from the housing after breakage of the sealing layer by way of the engagement of the protruding member against the housing as the housing is connected to the coolant circulation system.

In an embodiment, the present invention also provides a method of supplying liquid coolant additive to a coolant circulation system. The method comprises the step of providing a coolant filter assembly that includes a housing that accommodates a filter cartridge. A sealed packet of coolant additive is contained within the filter cartridge. The housing further comprises a means for puncturing the sealed packet in connection of the housing to the coolant circulation system. The housing, with the filter cartridge and the sealed packet is connected to the coolant circulation system which results in a puncturing of the sealed packet and release of liquid coolant additive to the coolant circulation system.

A chamber is provided in the interior of a hollow-cylindrical filter insert which is sealed by an outer skin. The chamber contains a cooling medium additive. At least one area of the outer skin of the chamber will open under the influence of pressure and/or heat after connecting the housing to the motor housing, or the housing members or of at least one opening means when connecting the housing with the motor housing or the two housing members. With the liquid cooling medium additive disposed in a closed chamber, the additive may be easily transported and stored.

Further, the present invention ensures that the chamber will automatically open during or after joining together the housing members without a leakage occurring outwards during this operation.

Advantageously, it is provided that the opening means is at least one spike or pointed member attached at the motor housing or a housing member, respectively, and the area to be opened is formed by a diaphragm to be penetrated by the at least one spike, pointed member or protruding member. Therein, the length of the spike is to be dimensioned such that the distance covered by the two housing members in order to be connected with each other is somewhat larger than the length of the spike. This feature prevents any leakage of the additive during the installation of the filter.

In an alternate embodiment, the opening means is at least one outwardly protruding lifter or member at an outside front wall of the chamber. Adjacent to the lifter is a break-off line or score line provided in the front wall which breaks upon engagement of the lifter with the adjacent housing member. In this embodiment, the lifter is attached to the chamber and will penetrate thereinto when connecting the two housing members with each other.

As a further alternative, the opening means is at least one spike or protruding member attached at the motor housing or a housing member, and/or at least one outwardly protruding lifter or member is provided at a front wall of the chamber. The wall thickness of the chamber is reduced adjacent to the spike or the lifter.

Preferably, the chamber comprises a generally cylindrical shape with a jacket and two front sides wherein the jacket of the cylinder is formed as a supporting dome of the filter insert. Further, at least one front side comprises an area that can be opened. The space in the interior of the filter insert is optimally used. A separate supporting dome for the filter insert is avoided.

In an alternate embodiment, the chamber comprises a generally cylindrical shape and is insertable into the interior of the filter insert. At least one of the two front sides of the chamber can be opened. In this embodiment, a supporting dome for the filter is required. In each of the two embodiments described above, the chamber is axially displaceable in relation to the filter insert.

In a preferred embodiment, it is provided that the two housing members are to be connected by threading sections to be screwed into each other. The one housing member is cup-shaped, and the other housing member comprises an inlet opening and an outlet opening. A snap-in means is arranged at the bottom of the cup-shaped housing member with the snap-in means to be connected with corresponding snap-in means at the front side of the filter insert.

The front side of the chamber facing the snap-in means comprises a break-off line with an outwards protruding lifter arranged adjacent thereto. The lifter opens or punctures the break-off line upon screwing the housing members together. The front side of the chamber facing away from the snap-in means comprises a diaphragm or break-off line that is engageable with a spike or protruding member upon screwing together the housing members. The spike is attached to the other housing member that opens the diaphragm or break-off line.

During the service of the cooling medium filter, the filter insert with the snap-in means is snapped into the bottom of the cup-shaped housing member. Then, the cup-shaped housing member is screwed onto the other housing member. With a thread length of 30 mm in an embodiment, the two housing members approach each other and are sealingly threadably connected such that the protruding member attached to the housing and also the protruding member attached to the chamber when engaging the diaphragm or the one front wall of the filter insert, respectively, will open the chamber. Therefore, the chamber is open at both front sides thereof and the cooling medium will stream therethrough resulting in a direct mixing of the liquid cooling medium additive in the interior of the chamber with the remaining circulating coolant.

In another embodiment, it is provided that the housing is cup-shaped and comprises a central opening with an inner thread at one of the front walls with the inner thread to be screwed on a corresponding threaded connection piece of the motor housing. The connection piece of the motor housing encompasses the outlet opening. A front wall of at least one inlet opening is provided so that an annular sealing area is disposed at the front wall in an area disposed radially outwards from the at least one inlet opening with the annular sealing area sealingly abutting the motor housing upon connection. The front wall of the chamber that faces away from the threaded connection piece comprises a break-off line with an outwards protruding lifter or member arranged adjacent thereto. The lifter opens or punctures the break-off line upon screwing on the housing. The other front side of the chamber comprises a diaphragm or break-off line which is engageable with a spike or protruding member upon screwing on the housing wherein the spike is arranged at the threaded connection piece and opens the diaphragm or break-off line. The advantageous effect of this embodiment is the same as with the embodiment described above with the exception that with this embodiment a cup-shaped housing to be screwed on is used which is known in the art as a spin-on filter.

Finally, the seal(s) containing the coolant additive within the chamber disposed in the filter cartridge may be melted by heat generated by the motor as opposed to a puncturing or cutting process as discussed above.

For practical reasons, the chamber comprises spacer projections disposed on a front side thereof with the height thereof being smaller than that of the lifter. Thereby, a good streaming path is provided.

For practical reasons, the chamber is made of plastic material and the diaphragm is a plastic or metal foil for simplified manufacturing. Preferably, the diaphragm is shaped by a thinned area of the outer skin.

BRIEF DESCRIPTION OF THE DRAWINGS

Preferred embodiments of the invention are now further described in the following drawings wherein.

DETAILED DESCRIPTION OF THE PRESENTLY PREFERRED EMBODIMENTS

Figure 1:
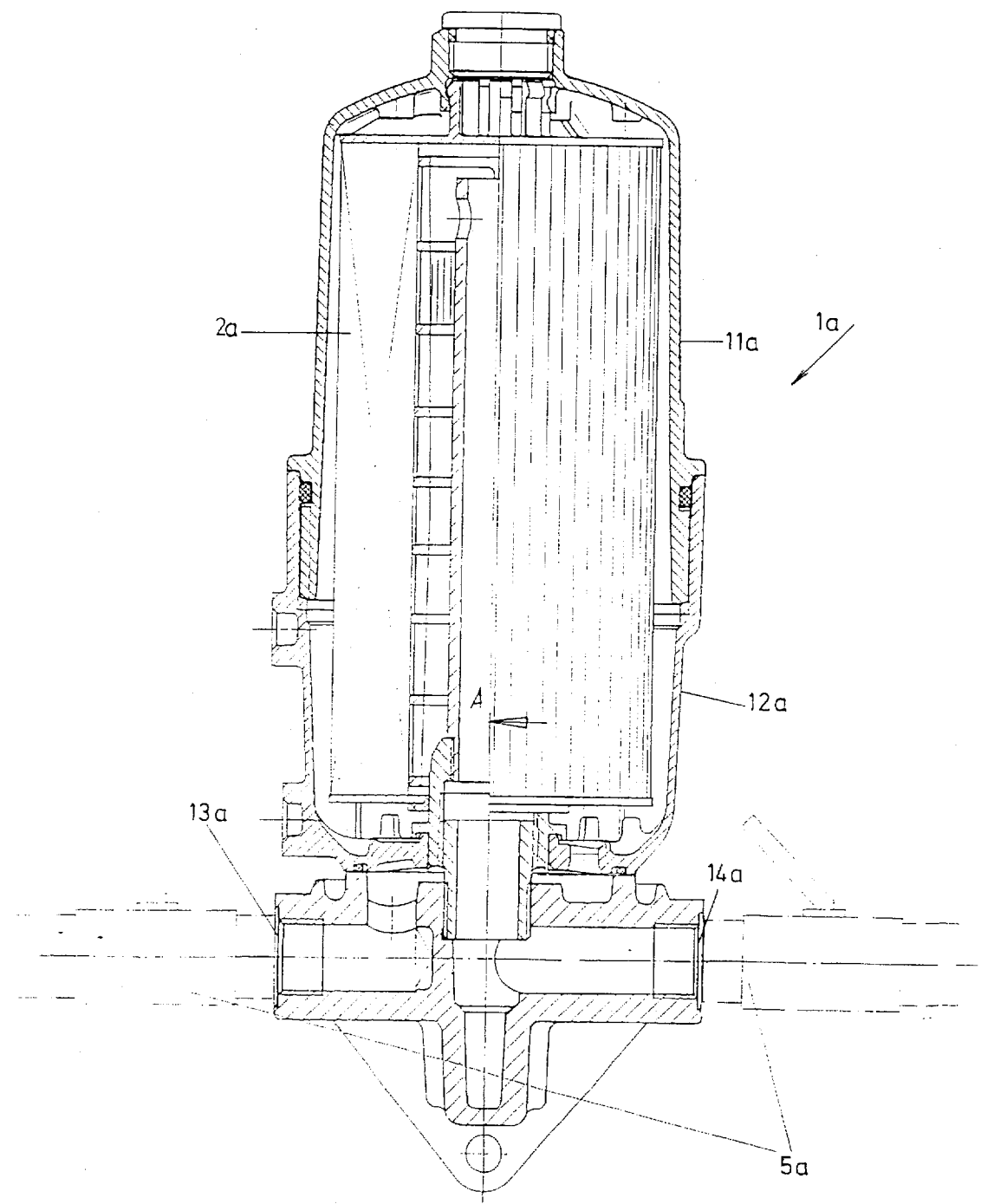
FIG. 1 is an elevational view, partly in section, of an embodiment of the present invention.

Referring to FIG. 1, the cooling medium filter comprises a housing 1a encompassing an upper housing member 11a which is cup-shaped and is supported at the open edge thereof by a threaded section and a sealing at a lower housing member 12a. The lower housing member 12 is provided with an inlet opening 13a and an outlet opening 14a for the cooling medium. A check valve 5a is attached in front of the inlet opening 13a and the outlet opening 14a.

The construction of the housing 1a is known from the state of the art and must not be further explained in this context. In the interior of the housing 1 there is a filter insert 2a comprising two front disks and a folded rim of paper or other suitable materials.

Figure 2:
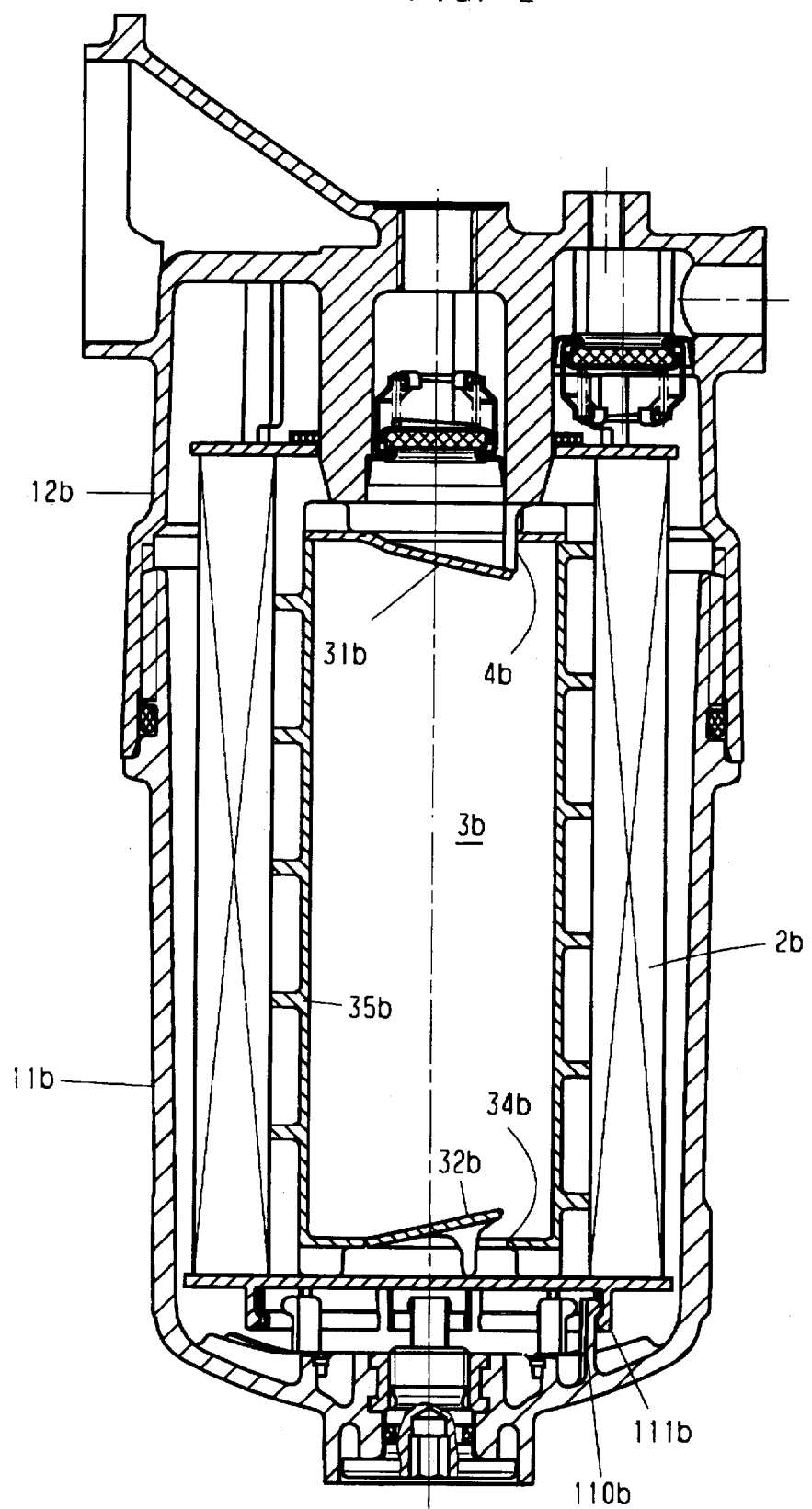
FIG. 2 is a sectional view of a second embodiment of the present invention.

FIG. 2 illustrates the two housing members 11b and 12b in a threadably connected condition wherein a chamber 3b in the interior of the filter insert 2b has already been opened.

The filter insert 2b at the lower front disk thereof comprises snap-in means 111b which are engageable with snap-in means 110b at the housing member 11b. The snap-in connection is known in the art.

In the embodiment illustrated the chamber 3b is designed with a jacket serving as a supporting dome 35b for the filter insert 2b.

At the lower front side in FIG. 2, the chamber 3b comprises a lifter 32b beside which a break-off line 34b is provided in the front wall. As illustrated in FIG. 2, the break-off line is already broken by the contact of the lifter 32 when screwing together the two housing members 11b and 12b.

During this procedure, the chamber 3b also at the upper front side thereof (see FIG. 2) has been opened wherein a spike 4b having been attached at the upper housing member 12b protruding in axial direction has broken a diaphragm 31b at the upper front side of the chamber 3b.

By this means, coolant will flow through the chamber 3b in the axial direction.

Figure 3:
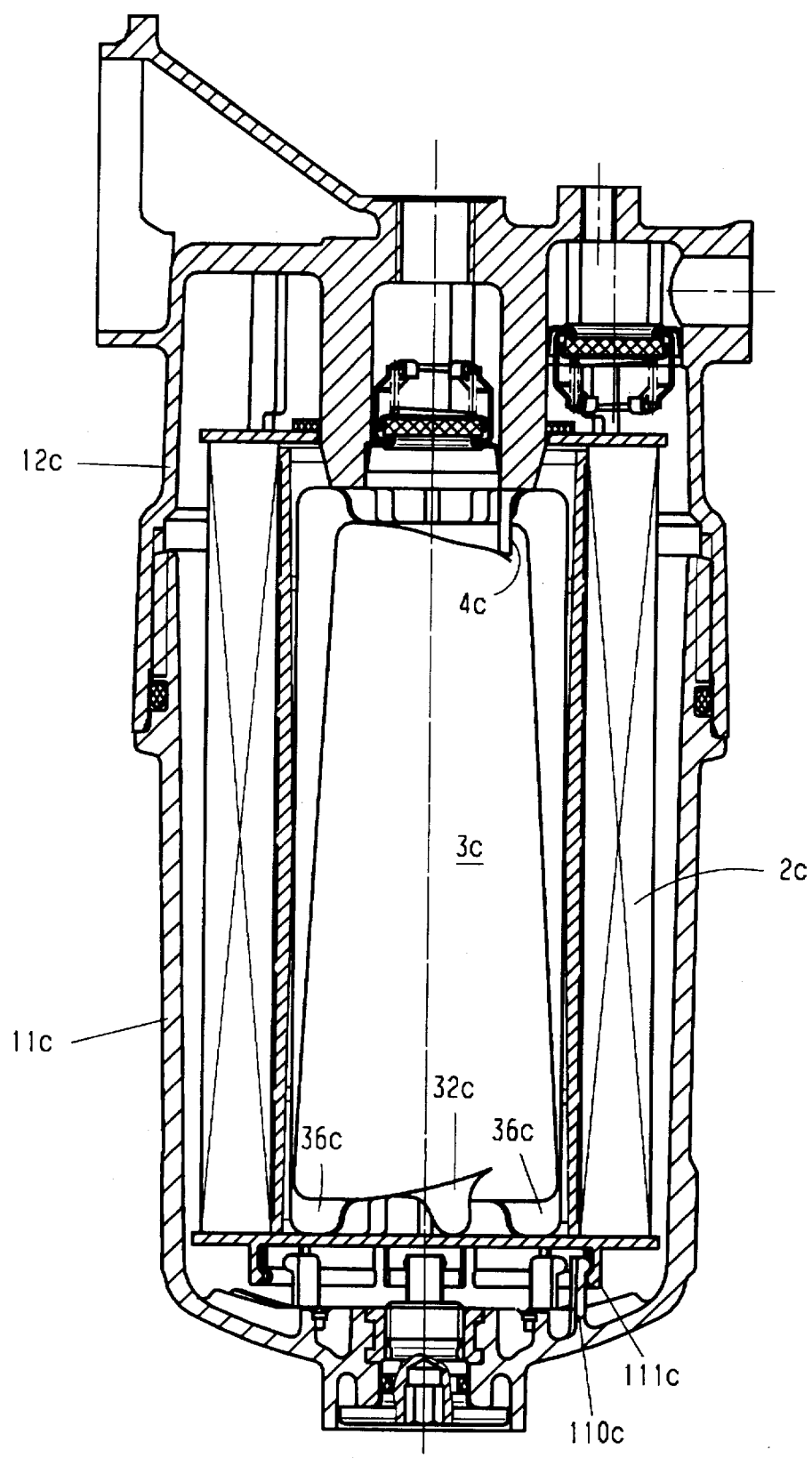
FIG. 3 is a sectional view of a third embodiment of the present invention.

FIG. 3 illustrates another embodiment of a chamber 3. In this embodiment, the chamber 3c is designed as a chamber which is closed at all sides thereof and to be inserted into the interior of the filter insert 2c with the jacket of the chamber not serving as a supporting dome. When threadably connecting the housing members 11 and 12, the lifter 32c will press against the lower front disk of the filter insert 2c and will open a break-off line positioned beside the projections 36c whereby the lower front wall of the chamber 3c is opened. Simultaneously, during the joining operation, the spike 4c which is positioned similar to the embodiment in FIG. 2 will penetrate through a further break-off line or a thin wall area at the lower front side of the chamber 3c and will open the chamber.

The attachment with snap-in means 110 and 111 corresponds with the embodiment in FIG. 2. When inserting the chamber 3c into the interior of the filter insert 2c, the latter will first be secured with the snap-in means 110c and 111c at the housing member 11c.

Figure 4:
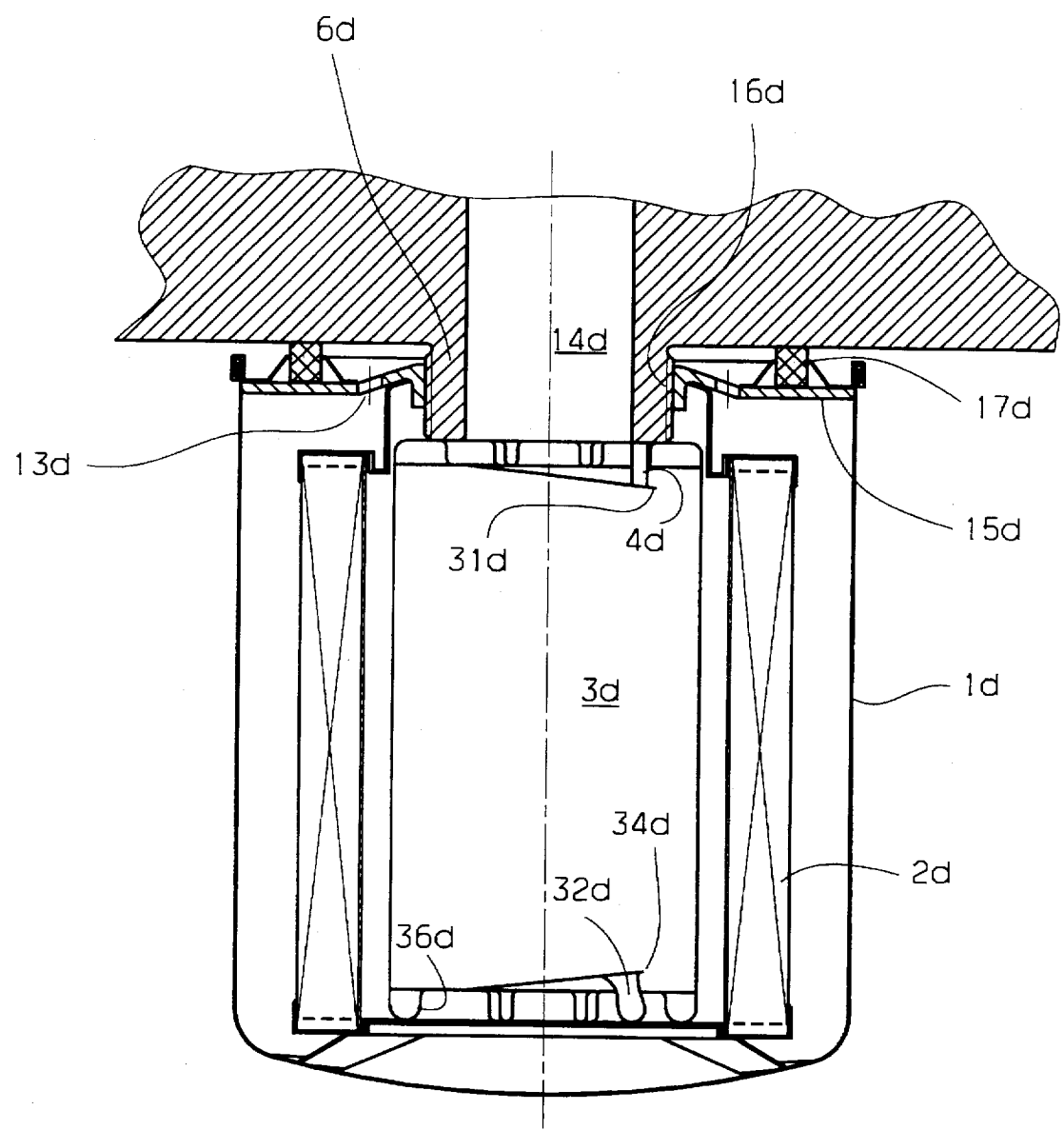
FIG. 4 is a sectional view of a fourth embodiment of the present invention.

FIG. 4 illustrates a further embodiment of the cooling medium filter. A cup-shaped housing 1d encompasses a filter insert 2d. In the interior of the filter insert 2d, a chamber 3d is provided with generally cylindrical form. At the lower front side of the chamber 3d (see FIG. 4) a lifter 32d is attached adjacent to a break-off line 34d, and several projections 36d with the height thereof smaller than the height of the lifter 32d. At the opposite front side of chamber 3d, a break-off line 31d is provided. The housing 1 comprises a front wall 15d facing a motor housing positioned above in FIG. 4 and not provided with a numeral. The front wall 15d comprises a central opening 16d with an inner thread which may be screwed onto a threaded connection piece 6d in the motor housing which has a corresponding outer thread. An outlet opening 14d for the filtered medium is positioned centrally in the threaded connection piece 6d.

Further, the front wall provides several inlet openings 13d through which the medium to be filtered, cooling water or coolant in this case, will enter into the housing 1. The corresponding connection lines in the motor housing are not illustrated. An annual sealing 17d is attached at the front wall 15d radially outwards of the inlet openings. The threaded connection piece 6d supports a spike 4d at the free end thereof.

When the housing 1d with the inserted closed chamber 3d is screwed onto the threaded connection piece 6d the spike 4d will break the break-off line 31d, and the lifter 32d opens the break-off line 34d such, that the medium streams through the chamber 3d. Therein the housing 1d is sealingly connected with the motor housing by means of the annual sealing 17d.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

What is claimed is:

1. A coolant filter assembly for attachment to a coolant circulation system of a motor, the filter comprising:
    a housing accommodating a cylindrical filter cartridge, the housing sealably connecting the assembly to the coolant circulation system,
    the filter cartridge having an outer surface, an inner surface and a first and second opposing ends,
    the filter cartridge accommodating a continuous sealing layer disposed between the inner surface, the first opposing end and the second opposing end of the filter cartridge to define a sealed chamber, the sealed chamber containing a coolant additive,
    the housing further comprising means for puncturing the sealing layer upon connection of the housing to the coolant circulation system, said means for puncturing comprising a protruding member disposed adjacent to one end of the filter that engages the sealing layer upon connection of the housing to the coolant circulation system.

2. The coolant filter assembly of claim 1 wherein the coolant additive is a liquid.

3. The coolant filter assembly of claim 1 wherein the protruding member is attached to the housing adjacent to one end of the filter cartridge, the protruding member engaging the sealing layer and puncturing the sealing layer when the housing is connected to the coolant circulation system.

4. The coolant filter assembly of claim 3 wherein the sealing layer comprises a scored line, the protruding member engaging the sealing member at the scored line.

5. The coolant filter assembly of claim 1 wherein the housing comprises two housing members that are threadably connected,
    the protruding member being attached to one of said housing members adjacent to one end of the filter cartridge, the protruding member engaging the sealing layer and puncturing the sealing layer when the two housing members are screwed together.

6. The coolant filter assembly of claim 1 wherein the protruding member is attached to the sealing layer, the protruding member engaging the housing and imparting stress to the sealing layer and puncturing the sealing layer when the housing is connected to the coolant circulation system.

7. The coolant filter assembly of claim 6 wherein the sealing layer further comprises at least one spacer member disposed adjacent to the protruding member, the spacer member having a height that is less than a height of the protruding member so that the protruding member will engage the housing before the spacer member engages the housing when the housing is connected to the coolant circulation system.

8. The coolant filter assembly of claim 1 wherein the protruding member is attached to the sealing layer at one end of the filter cartridge and a scored line disposed on the sealing layer adjacent to the protruding member, the protruding member engaging the housing and imparting stress to the sealing layer resulting in a tearing of the sealing layer along the scored line when the housing is connected to the coolant circulation system.

9. The coolant filter assembly of claim 8 wherein the sealing layer further comprises at least one spacer member disposed adjacent to the protruding member, the spacer member having a height that is less than a height of the protruding member so that the protruding member will engage the housing before the spacer member engages the housing when the housing is connected to the coolant circulation system.

10. The coolant filter assembly of claim 1 wherein the housing comprises two housing members that are threadably connected,
the protruding member being attached to the sealing layer at one end of the filter cartridge and a scored line disposed on the sealing layer adjacent to the protruding member, the protruding member engaging the housing and imparting stress to the sealing layer resulting in a tearing of the sealing layer along the scored line when the two housing members are screwed together.

11. The coolant filter assembly of claim 1 wherein at least one portion of the sealing layer disposed adjacent to one opposing end of the filter cartridge is fabricated from metal foil.

12. The coolant filter assembly of claim 1 wherein at least one portion of the sealing layer disposed adjacent to one opposing end of the filter cartridge is fabricated from a thinner material than the portion of the sealing layer disposed adjacent to the inner surface of the filter cartridge.

13. The coolant filter assembly of claim 1 wherein the sealing layer further comprises a plurality of supporting connections which engage the inner surface of the filter cartridge and provide structural support for the filter cartridge.

14. The coolant filter assembly of claim 1 wherein the housing further comprising an inlet and an outlet, the inlet providing communication from the coolant circulation system to the outer surface of the filter cartridge, the outlet providing communication from the sealing layer to the coolant circulation system.

15. A coolant filter assembly for attachment to a coolant circulation system of a motor, the filter comprising:
a housing accommodating a cylindrical filter cartridge, the housing sealably connecting the assembly to the coolant circulation system,
the filter cartridge having an outer surface, an inner surface and a first and second opposing ends,
the filter cartridge accommodating a continuous sealing layer disposed between the inner surface, the first opposing end and the second opposing end of the filter cartridge to define a sealed chamber, the sealed chamber containing a coolant additive,
the housing further comprising means for puncturing the sealing layer upon connection of the housing to the coolant circulation system, wherein the means for puncturing the sealing layer comprises a first protruding member attached to coolant circulation system adjacent to the first end of the filter cartridge and a second protruding member attached to the sealing layer at the second end of the filter cartridge,
the first protruding member engaging the sealing layer and puncturing the sealing layer when the housing is connected to the coolant circulation system, the second protruding member engaging the housing and imparting stress to the sealing layer and puncturing the sealing layer when the housing is connected to the coolant circulation system.

16. A coolant filter assembly for attachment to a coolant circulation system of a motor, the filter comprising:
a housing accommodating a cylindrical filter cartridge, the housing sealably connecting the assembly to the coolant circulation system,
the filter cartridge having an outer surface, an inner surface and a first and second opposing ends,
the filter cartridge accommodating a continuous sealing layer disposed between the inner surface, the first opposing end and the second opposing end of the filter cartridge to define a sealed chamber, the sealed chamber containing a coolant additive,
the housing further comprising means for puncturing the sealing layer upon connection of the housing to the coolant circulation system,
wherein the housing comprises two housing members that are threadably connected,
the means for puncturing the sealing layer comprises a first protruding member attached to the housing adjacent to one end of the filter cartridge and a second protruding member attached to the sealing layer at an opposing end of the filter cartridge,
the first protruding member engaging the sealing layer and puncturing the sealing layer when the two housing members are screwed together, the second protruding member engaging the housing and imparting stress to the sealing layer and puncturing the sealing layer when the two housing members are screwed together.

17. A coolant filter assembly for attachment to a coolant circulation system of a motor, the filter comprising:
a housing accommodating a cylindrical filter cartridge, the housing sealably connecting the assembly to the coolant circulation system,
the filter cartridge having an outer surface, an inner surface and a first and second opposing ends,
the filter cartridge accommodating a continuous sealing layer disposed between the inner surface, the first opposing end and the second opposing end of the filter cartridge to define a sealed chamber, the sealed chamber containing a coolant additive,
the housing further comprising means for puncturing the sealing layer upon connection of the housing to the coolant circulation system,
wherein the housing comprises a first housing member and a second housing member, the first and second housing members being threadably connected,
the first housing member comprising an inlet and an outlet, the inlet providing communication from the coolant circulation system to the outer surface of the filter cartridge, the outlet providing communication from the chamber to the coolant circulation system, the second housing member being cup shaped,
the means for puncturing the sealing layer comprises a first protruding member attached to the first housing member adjacent to the first end of the filter cartridge and a second protruding member attached to the sealing layer at the second end of the filter cartridge and adjacent to the second housing member, the first protruding member engaging the sealing layer and puncturing the sealing layer when the first and second housing members are screwed together, the second protruding member engaging the second housing member and imparting stress to the sealing layer and puncturing the sealing layer when the first and second housing members are screwed together.

18. A coolant filter assembly for attachment to a coolant circulation system of a motor, the filter comprising:

a housing accommodating a cylindrical filter cartridge, the housing sealably connecting the assembly to the coolant circulation system, the filter cartridge having an outer surface, an inner surface and a first and second opposing ends, the filter cartridge accommodating a continuous sealing layer disposed between the inner surface, the first opposing end and the second opposing end of the filter cartridge to define a sealed chamber, the sealed chamber containing a coolant additive, the housing further comprising means for puncturing the sealing layer upon connection of the housing to the coolant circulation system, wherein the housing is cup-shaped with an enclosed lower end and an upper end that is threadably connected to the coolant circulation system, the means for puncturing the sealing layer comprises a first protruding member attached to coolant circulation system adjacent to the first end of the filter cartridge and a second protruding member attached to the sealing layer at the second end of the filter cartridge, the first protruding member engaging the sealing layer and puncturing the sealing layer when the housing is screwed onto the coolant circulation system, the second protruding member engaging the housing and imparting stress to the sealing layer and puncturing the sealing layer when the housing is screwed onto to the coolant circulation system.

19. A coolant filter assembly for attachment to a coolant circulation system of a motor, the filter comprising:

a housing accommodating a cylindrical filter cartridge having an interior space and a sealed packet of coolant additive disposed inside interior space of the cylindrical filter cartridge, the housing sealably connecting the assembly to the coolant circulation system, the housing further including at least one protruding member that engages and punctures the sealed packet upon connection of the housing to the coolant circulation system.

20. A method of adding liquid coolant additive to a coolant circulation system of a motor, the method comprising the following steps:

providing a coolant filter assembly comprising a housing accommodating a cylindrical filter cartridge having an interior space and a sealed packet of coolant additive disposed inside interior space of the cylindrical filter cartridge, the housing further comprising a protruding member for puncturing the sealed packet upon connection of the housing to the coolant circulation system, connecting the housing to the coolant circulation system, and puncturing the sealed packet with said protruding member upon connection of the housing to the coolant circulation system.

* * * * *